United States Patent
Ohuchi et al.

(10) Patent No.: US 12,161,980 B2
(45) Date of Patent: Dec. 10, 2024

(54) FINE BUBBLE SUPPLY DEVICE, AND FINE BUBBLE ANALYZING SYSTEM

(71) Applicants: Shimadzu Corporation, Kyoto (JP); National Institute of Technology and Evaluation, Tokyo (JP); Fine Bubble Industries Association, Tokyo (JP)

(72) Inventors: Seika Ohuchi, Tokyo (JP); Mitsuru Tanaka, Tokyo (JP); Haruo Shimaoka, Kyoto (JP)

(73) Assignees: SHIMADZU CORPORATION, Kyoto (JP); National Institute of Technology and Evaluation, Tokyo (JP); Fine Bubble Industries Association, Tokyo (JP)

( * ) Notice: Subject to any disclaimer, the term of this patent is extended or adjusted under 35 U.S.C. 154(b) by 302 days.

(21) Appl. No.: 16/955,053

(22) PCT Filed: Mar. 15, 2019

(86) PCT No.: PCT/JP2019/010740
§ 371 (c)(1),
(2) Date: Jun. 18, 2020

(87) PCT Pub. No.: WO2019/181765
PCT Pub. Date: Sep. 26, 2019

(65) Prior Publication Data
US 2020/0376448 A1    Dec. 3, 2020

(30) Foreign Application Priority Data
Mar. 20, 2018  (JP) .................................. 2018-052148

(51) Int. Cl.
*B01F 23/00*    (2022.01)
*B01F 23/231*   (2022.01)
(Continued)

(52) U.S. Cl.
CPC ...... *B01F 23/23121* (2022.01); *B01F 23/233* (2022.01); *B01F 35/213* (2022.01);
(Continued)

(58) Field of Classification Search
CPC ........ B01F 23/23121; B01F 2215/0422; B01F 35/213; B01F 2215/0431; B01F 2215/0427; B01F 2215/0459; G01N 15/021
See application file for complete search history.

(56) References Cited

U.S. PATENT DOCUMENTS 5,403,088 A * 4/1995 Killmer ............. B01F 23/23341
366/136
2007/0223916 A1  9/2007 Higuchi et al.
(Continued)

FOREIGN PATENT DOCUMENTS

JP    2007288134    11/2007
JP    2008309746    12/2008
(Continued)

OTHER PUBLICATIONS

"Office Action of Japan Counterpart Application", issued on Nov. 30, 2021, with English translation thereof, p. 1-p. 8.
(Continued)

*Primary Examiner* — Anshu Bhatia
(74) *Attorney, Agent, or Firm* — JCIPRNET (57) ABSTRACT

Provided is a fine bubble supply device and a fine bubble analyzing system capable of more stably supplying fine bubbles unstable in a liquid.
A fine bubble generating device generates fine bubbles. A retention vessel stores a liquid therein, and an inlet pipe and an outlet pipe of the fine bubbles are connected to the retention vessel. The fine bubbles generated from the fine bubble generating device are introduced into the liquid in the
(Continued)

retention vessel through the inlet pipe to be retained in the liquid. The fine bubbles retained in the liquid are led out to a supply destination (fine bubble characteristic evaluation device) through the outlet pipe.

11 Claims, 8 Drawing Sheets

(51) Int. Cl.
    *B01F 23/233*     (2022.01)
    *B01F 35/213*     (2022.01)
    *G01N 15/0205*     (2024.01)

(52) U.S. Cl.
    CPC .... *G01N 15/0211* (2013.01); *B01F 23/23128* (2022.01); *B01F 2215/0422* (2013.01); *B01F 2215/0427* (2013.01); *B01F 2215/0431* (2013.01); *B01F 2215/0459* (2013.01)

(56) References Cited

U.S. PATENT DOCUMENTS

| | | |
|---|---|---|
| 2010/0163084 A1 | 7/2010 | Haibara |
| 2011/0301531 A1 | 12/2011 | Spears et al. |
| 2013/0118977 A1 | 5/2013 | Eppink et al. |
| 2015/0190565 A1* | 7/2015 | Ohdaira ............... B01D 63/024 604/151 |
| 2018/0326367 A1 | 11/2018 | Roe |

FOREIGN PATENT DOCUMENTS

| | | |
|---|---|---|
| JP | 2010125441 | 6/2010 |
| JP | 2010153615 | 7/2010 |
| JP | 2013128869 | 7/2013 |
| JP | 2014533201 | 12/2014 |
| JP | 2015037765 | 2/2015 |
| JP | 2016048185 | 4/2016 |
| WO | 2014021165 | 2/2014 |

OTHER PUBLICATIONS

"International Search Report (Form PCT/ISA/210) of PCT/JP2019/010740," mailed on Jun. 4, 2019, with English translation thereof, pp. 1-4.
"Written Opinion of the International Searching Authority (Form PCT/ISA/237) of PCT/ JP2019/010740," mailed on Jun. 4, 2019, with English translation thereof, pp. 1-12.
"Office Action of Japan Counterpart Application" with English translation thereof, issued on Jul. 5, 2022, p. 1-p. 10.
"Office Action of Japan Counterpart Application", issued on Sep. 5, 2023, with English translation thereof, p. 1-p. 9.

\* cited by examiner

FINE BUBBLE SUPPLY DEVICE, AND FINE BUBBLE ANALYZING SYSTEM

CROSS-REFERENCE TO RELATED APPLICATION

This application is a 371 application of an international PCT application serial no. PCT/JP2019/010740, filed on Mar. 15, 2019, which claims the priority benefit of Japan application JP2018-052148, filed on Mar. 20, 2018. The entirety of each of the above-mentioned patent applications is hereby incorporated by reference herein and made a part of this specification.

TECHNICAL FIELD

The present invention relates to a fine bubble supply device that generates and supplies fine bubbles to a supply destination, and a fine bubble analyzing system using the same.

BACKGROUND ART

In recent years, fine bubbles such as microbubbles and ultrafine bubbles have been actively researched and utilized. Fine bubbles are miniscule air bubbles having a bubble diameter of 100 µm or less. Among fine bubbles, fine bubbles having a bubble diameter of 1 µm or more are called microbubbles, and those having a bubble diameter of less than 1 µm are called ultrafine bubbles. Ultrafine bubbles have characteristics of having long retention time in a liquid, and are known to be retained in a liquid for several months.

Fine bubbles are expected to have various effects such as a cleaning effect and a sterilizing effect. For example, cleaning various facilities with fine bubbles in a factory, a plant, a public toilet, or the like will be able to reduce a use amount of detergent. Thus, a cleaning method using fine bubbles has attracted attention as a new environmentally friendly cleaning method.

The relationship between the characteristics and effects of fine bubbles as described above depends on a bubble diameter (size) and concentration (bubble amount) of fine bubbles. As a result, a technique of measuring a bubble diameter distribution (particle diameter distribution) of fine bubbles using a laser diffraction particle size analyzer or the like has been proposed (for example, see Patent Document 1).

PRIOR ART DOCUMENT

Patent Document

Patent Document 1: JP 2016-48185 A

SUMMARY OF THE INVENTION

Problems to be Solved by the Invention

However, the characteristics of fine bubbles having a relatively large bubble diameter, such as microbubbles having shorter retention time in a liquid compared to that of ultrafine bubbles, may be difficult to evaluate accurately since such fine bubbles are unstable in a liquid. Specifically, fine bubbles having a relatively large bubble diameter are likely to change the bubble diameter, concentration, and the like in a liquid from moment to moment, and may disappear in a short time.

Such a problem can occur not only in microbubbles but also in, for example, ultrafine bubbles having a bubble diameter close to 1 µm. Further, there is a possibility that such a problem may occur in ultrafine bubbles having an even smaller bubble diameter depending on conditions for generating fine bubbles.

The present invention has been made in view of the above circumstances, and an object of the present invention is to provide a fine bubble supply device and a fine bubble analyzing system that can supply unstable fine bubbles in a liquid more stably or in a more homogeneously dispersed state.

Means for Solving the Problems

A fine bubble supply device according to the present invention includes a fine bubble generating device and a retention vessel. The fine bubble generating device generates fine bubbles. The retention vessel stores a liquid therein, and an inlet pipe and an outlet pipe for fine bubbles are connected to the retention vessel. The fine bubbles generated from the fine bubble generating device are introduced into the liquid in the retention vessel through the inlet pipe to be retained in the liquid. The fine bubbles retained in the liquid are led out to a supply destination through the outlet pipe.

With this configuration, the fine bubbles generated from the fine bubble generating device are retained in the liquid in the retention vessel, and then are supplied from the retention vessel to the supply destination. This allows the fine bubbles to be supplied to the supply destination while maintaining conditions such as retention time in the retention vessel at a constant level. The fine bubbles unstable in the liquid can be supplied more stably or in a more homogeneously dispersed state.

The outlet pipe may lead out the fine bubbles retained in the liquid from an outlet opening downward and disposed in the liquid in the retention vessel. In this case, the inlet pipe may introduce the fine bubbles into the liquid in the retention vessel from the inlet disposed at a position lower than the outlet.

With this configuration, the outlet disposed in the liquid in the retention vessel opens downward, and thus the fine bubbles retained in the liquid are smoothly led out of the outlet by buoyancy. Further, since the fine bubbles are introduced into the liquid in the retention vessel from the inlet disposed at a position lower than the outlet, the fine bubbles that float by the buoyancy in the liquid are stably led from the inlet to the outlet. The fine bubbles unstable in the liquid can be thus supplied more stably.

An inner diameter of the outlet pipe and a flow velocity of the liquid inside the outlet pipe are preferably set such that a Reynolds number is 2,300 or less.

This configuration can prevent turbulence from occurring in the outlet pipe, and as a result, prevent a change in the bubble diameter and concentration of the fine bubbles. The fine bubbles can be thus supplied more stably.

The inner diameter of the outlet pipe and the flow velocity of the liquid inside the outlet pipe are preferably set such that the Reynolds number is 1,250 or less.

The outlet pipe preferably includes a material whose inner surface has a negative potential.

This configuration can prevent the fine bubbles having a negative surface potential from adhering to the inner surface of the outlet pipe. This allows the fine bubbles to flow smoothly in the outlet pipe, thereby supplying the fine bubbles more stably.

The inner diameter of the outlet pipe is preferably 2 mm or more.

A curvature of the outlet pipe is preferably 100 mm or more.

A surface roughness of the outlet pipe is preferably 0.4 μm or less.

It is preferable that the inlet pipe extend in a horizontal direction, and the inlet port be disposed below the outlet in the retention vessel.

A straight line connecting the inlet and the outlet is preferably inclined by 30° to 60° with respect to the horizontal direction.

The straight line connecting the inlet and the outlet is preferably from 10 cm to 20 cm.

The retention vessel preferably functions as a buffer that further homogenizes dispersion of the fine bubbles in the retention vessel by retaining the fine bubbles for retention time.

The retention vessel is preferably provided with a stirring device that further homogenizes the dispersion of the fine bubbles in the retention vessel by stirring the fine bubbles retained in the retention vessel.

A fine bubble analyzing system according to the present invention includes the fine bubble supply device, and a fine bubble characteristic evaluation device that evaluates characteristics of fine bubbles supplied from the fine bubble supply device.

This configuration allows the fine bubbles to be stably supplied from the fine bubble supply device to the fine bubble characteristics evaluation device. Thus, the characteristics of the fine bubbles can be accurately evaluated by the fine bubble characteristic evaluation device.

The fine bubble analyzing system may further include a pump provided downstream of the fine bubble characteristic evaluation device. In this case, the fine bubbles retained in the retention vessel may be sucked into the fine bubble characteristic evaluation device through the outlet pipe by driving of the pump.

With this configuration, by driving the pump provided downstream of the fine bubble characteristic evaluation device, the fine bubbles can be sucked into the fine bubble characteristic evaluation device and the characteristics of the fine bubble can be evaluated. When the pump is provided upstream of the fine bubble characteristic evaluation device, a state of the fine bubbles supplied to the fine bubble characteristic evaluation device is changed by driving of the pump. On the other hand, a configuration of the present invention in which the pump is provided downstream of the fine bubble characteristic evaluation device can prevent a change in the state of the fine bubbles due to driving of the pump from affecting an evaluation result of the fine bubble characteristic evaluation device.

Effects of the Invention

The present invention allows the fine bubbles to be supplied to the supply destination while maintaining conditions such as retention time in the retention vessel at a constant level. The fine bubbles unstable in the liquid can be supplied more stably or in a more homogeneously dispersed state.

MODE FOR CARRYING OUT THE INVENTION

1. Configuration of Fine Bubble Analyzing System

Figure 1:
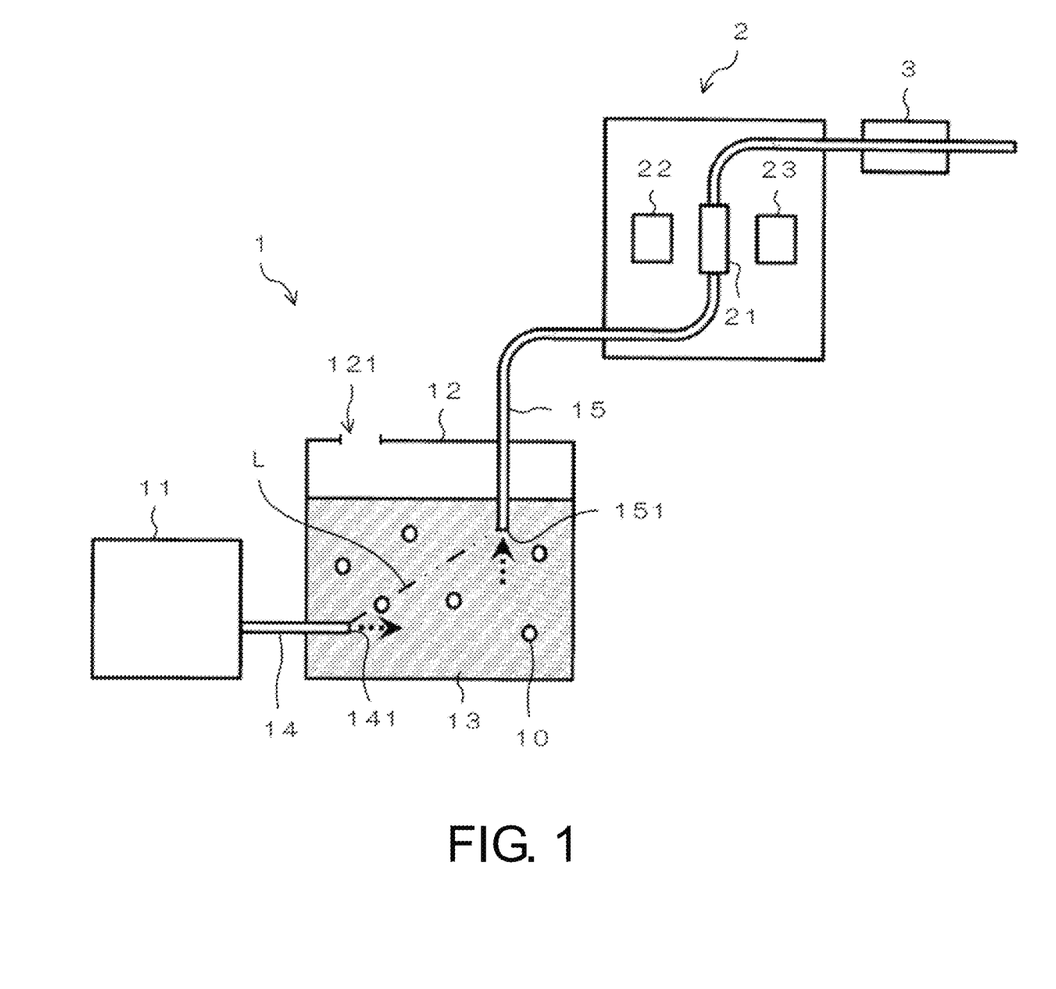
FIG. 1 is a schematic diagram showing a configuration example of a fine bubble analyzing system according to an embodiment of the present invention.

FIG. 1 is a schematic diagram showing a configuration example of a fine bubble analyzing system according to an embodiment of the present invention. This fine bubble analyzing system includes a fine bubble supply device 1, a fine bubble characteristic evaluation device 2, and a pump 3.

The fine bubble supply device 1 is a device that supplies fine bubbles to a supply destination. In the present embodiment, the supply destination of the fine bubbles is the fine bubble characteristic evaluation device 2. The fine bubbles are supplied from the fine bubble supply device 1 to the fine bubble characteristic evaluation device 2, and thus the characteristics of the fine bubbles are evaluated by the fine bubble characteristic evaluation device 2.

The fine bubble supply device 1 includes a fine bubble generating device 11 and a retention vessel 12. The fine bubble generating device 11 is a device that generates fine bubbles, and the fine bubbles generated from the fine bubble generating device 11 are introduced into the retention vessel 12.

In the present embodiment, the fine bubble generating device 11 generates a liquid containing fine bubbles in a dispersed state (fine bubble-containing medium). The fine bubble-containing medium is introduced into the retention vessel 12. Alternatively, the fine bubble generating device 11 may be a device that generates fine bubbles in a liquid stored in the retention vessel 12. The fine bubble-containing medium is a medium using, as an undiluted solution, any liquid such as water, alcohol, or oil, for example, and includes fine bubbles composed of miniscule air bubbles having a bubble diameter of less than 100 μm, for example.

Specifically, at least either ultrafine bubbles having a bubble diameter of less than 1 μm or microbubbles having a bubble diameter of 1 μm or more are contained in the undiluted solution as gas particles. A gas configuring the gas particles may be air or a gas other than air such as nitrogen, ozone, or carbon dioxide.

An opening 121 is formed in an upper part of the retention vessel 12, and the inside of the retention vessel 12 is open to the atmosphere. A liquid (medium) 13 is stored in the retention vessel 12 in advance, and the fine bubble-containing medium from the fine bubble generating device 11 is introduced into the liquid 13. A drain port (not shown) may be formed in the upper part of the retention vessel 12, and an increased amount of the liquid 13 may be drained from the drain port. Alternatively, a circulation port (not shown) may be formed in the upper part of the retention vessel 12, and the liquid 13 may be circulated from the circulation port to the fine bubble generating device 11.

An inlet pipe 14 that introduces the fine bubble-containing medium from the fine bubble generating device 11 is connected to the retention vessel 12. The fine bubbles 10 introduced into the liquid 13 in the retention vessel 12 through the inlet 141 formed at one end of the inlet pipe 14 are dispersed and retained in the liquid 13. When the fine bubbles 10 are, for example, microbubbles, the retention time in the liquid 13 is shorter than that of ultrafine bubbles.

Further, an outlet pipe 15 that leads out the liquid 13 in the retention vessel 12 is connected to the retention vessel 12. The liquid 13 in the retention vessel 12 is supplied to the fine bubble characteristic evaluation device 2 through the outlet pipe 15. The pump 3 is connected to the outlet pipe 15 downstream of the fine bubble characteristic evaluation device 2. By driving the pump 3, part of the liquid 13 in the retention vessel 12 is led out through an outlet 151 formed at one end of the outlet pipe 15, and the fine bubbles 10 retained in the liquid 13 are sucked into the fine bubble characteristic evaluation device 2.

As described above, in the present embodiment, the fine bubbles 10 generated from the fine bubble generating device 11 are introduced into the liquid 13 in the retention vessel 12 through the inlet pipe 14 to be retained in the liquid 13. The fine bubbles 10 retained in the liquid 13 are led out to the fine bubble characteristic evaluation device 2 through the outlet pipe 15. This allows the fine bubbles 10 to be supplied to the fine bubble characteristic evaluation device 2 while maintaining conditions such as the retention time in the retention vessel 12 at a constant level. The fine bubbles 10 (for example, microbubbles) unstable in the liquid 13 can be supplied more stably.

That is, the retention vessel 12 continuously generates fine bubbles in the retention vessel 12 and retains the fine bubbles for the retention time, thereby circulating the dispersion of the fine bubbles in the retention vessel 12. The retention vessel 12 functions as a buffer that homogenizes the dispersion of the fine bubbles in the retention vessel 12. The retention vessel 12 is provided to evaluate the fine bubble generating device 11 under certain recommended conditions. Further, the retention vessel 12 is used to determine a dispersion state of the fine bubbles 10 in the liquid in actual use conditions of the fine bubbles 10.

The fine bubble characteristic evaluation device 2 is, for example, a laser diffraction particle size analyzer, and evaluates a particle size distribution (bubble size distribution) of the fine bubbles 10 as characteristics. The fine bubble characteristic evaluation device 2 includes a measurement cell 21, a light source 22, a detector 23, and the like. The measurement cell 21 is configured by a flow cell, and the fine bubbles 10 supplied through the outlet pipe 15 pass through the measurement cell 21.

The light source 22 is configured by for example, a laser light source, and the measurement cell 21 is irradiated with laser light emitted from the light source 22. At this time, the laser light from the light source 22 is diffracted or scattered by particle groups of the fine bubbles 10 in the measurement cell 21 and then received by the detector 23. The detector 23 is configured by, for example, a photodiode array.

The detector 23 in the present embodiment is a ring detector configured by arranging a plurality of front sensors (not shown) on which a ring-shaped or semi-ring-shaped detection surface having a different radius is formed, concentrically around an optical axis of the laser light emitted from the light source 22. Light with a diffraction or scattering angle corresponding to each position is incident on each of the sensor elements. Consequently, a detection signal of each sensor elements of the detector 23 indicates an intensity of light at each diffraction or scattering angle.

The detection signal of each sensor elements of the detector 23 is converted from an analog signal to a digital signal by an A/D converter (not shown), and the bubble diameter distribution of the fine bubbles 10 is calculated on the basis of the detection signal. The method of this calculation is well known, and a detailed description thereof will be omitted. The sensor is not limited to a sensor elements provided in front of the measurement cell 21 (on a side opposite to the light source 22). The detector 23 may include at least either a side sensor provided on a side of the measurement cell 21 or a rear sensor provided behind the measurement cell 21 (on a side of the light source 22).

In the present embodiment, as described above, the fine bubbles 10 can be supplied from the fine bubble supply device 1 to the fine bubble characteristic evaluation device 2 stably or by homogenizing the dispersion. Thus, the characteristics of the fine bubbles 10 can be accurately evaluated by the fine bubble characteristic evaluation device 2.

In particular, in the present embodiment, by driving the pump 3 provided downstream of the fine bubble characteristic evaluation device 2, the fine bubbles 10 are sucked into the fine bubble characteristic evaluation device 2 and the characteristics of the fine bubble 10 can be evaluated. When the pump 3 is provided upstream of the fine bubble characteristic evaluation device 2, a state of the fine bubbles 10 supplied to the fine bubble characteristic evaluation device 2 is changed by driving of the pump 3. On the other hand, a configuration of the present embodiment in which the pump 3 is provided downstream of the fine bubble characteristic evaluation device 2 can prevent a change in the state of the fine bubbles due to driving of the pump 3 from affecting an evaluation result of the fine bubble characteristic evaluation device 2.

The fine bubble characteristic evaluation device 2 is disposed near the fine bubble supply device 1 (that is, the retention vessel 12) by shortening a length of the outlet pipe 15. As a result, fine bubbles can be supplied from the retention vessel 12 to the fine bubble characteristic evaluation device 2 in a short time. Thus, the fine bubbles can be evaluated while minimizing an influence of disappearance or decreased dispersibility of the fine bubbles.

2. Measurement Results of Bubble Size Distribution

Figure 2:
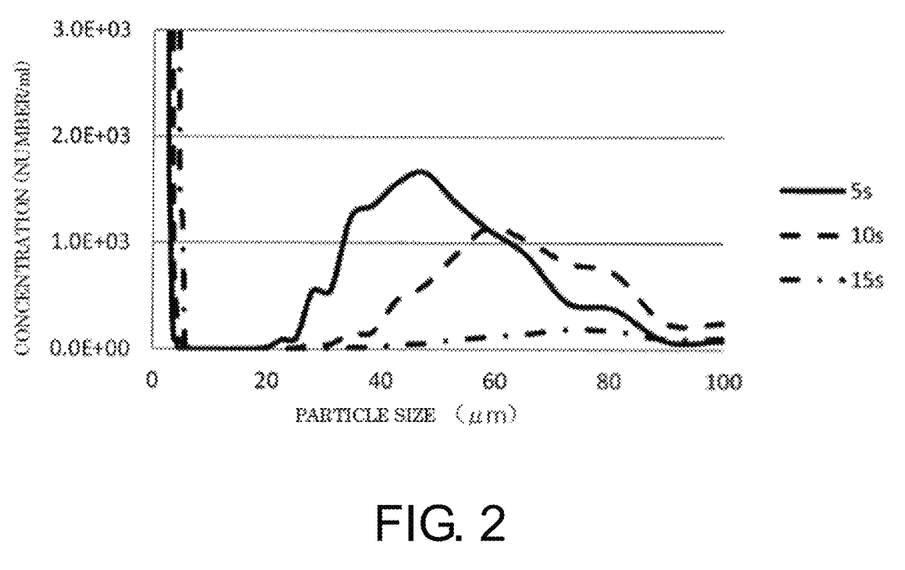
FIG. 2 is a graph showing results of measuring a bubble size distribution of fine bubbles (microbubbles) by a laser diffraction method using the fine bubble analyzing system.

FIG. 2 is a graph showing results of measuring the bubble size distribution of the fine bubbles 10 (microbubbles) by a laser diffraction method using the fine bubble analyzing system. FIG. 2 shows the measurement results of the bubble size distribution when time from an introduction of the fine bubble-containing medium into the outlet 151 until arrival at the measurement cell 21 is 5 seconds, 10 seconds, and 15 seconds.

Figure 3:
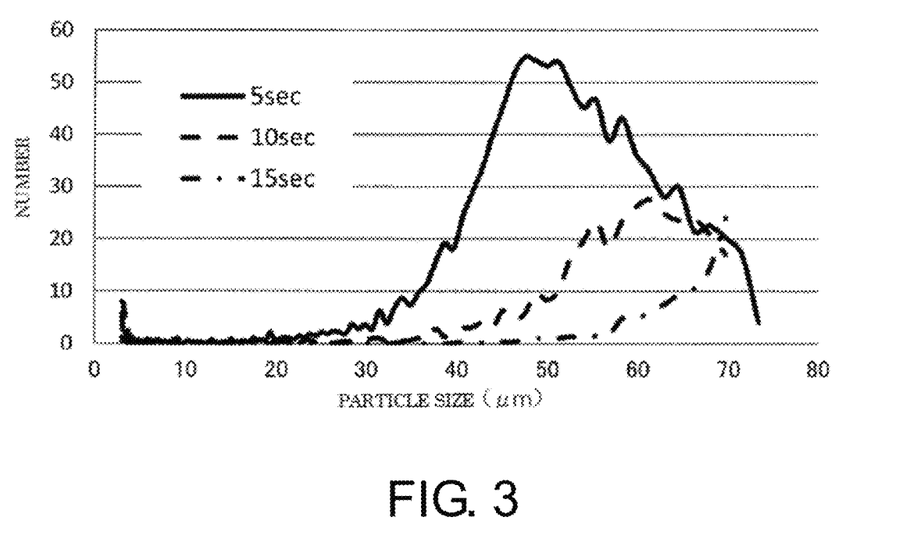
FIG. 3 is a graph showing results of measuring the bubble size distribution of fine bubbles (microbubbles) by a dynamic image analyzing method using the fine bubble analyzing system.

FIG. 3 is a graph showing results of measuring the bubble size distribution of the fine bubbles 10 (microbubbles) by a dynamic image analyzing method using the fine bubble analyzing system. FIG. 3 shows the measurement results of the bubble size distribution when time from the introduction of the fine bubble-containing medium into the inlet 151 until arrival at the measurement cell 21 is 5 seconds, 10 seconds, and 15 seconds. As described above, the fine bubble characteristic evaluation device 2 may be configured to measure the bubble size distribution of the fine bubbles 10 by the dynamic image analyzing method instead of the laser diffraction method.

Figure 4:
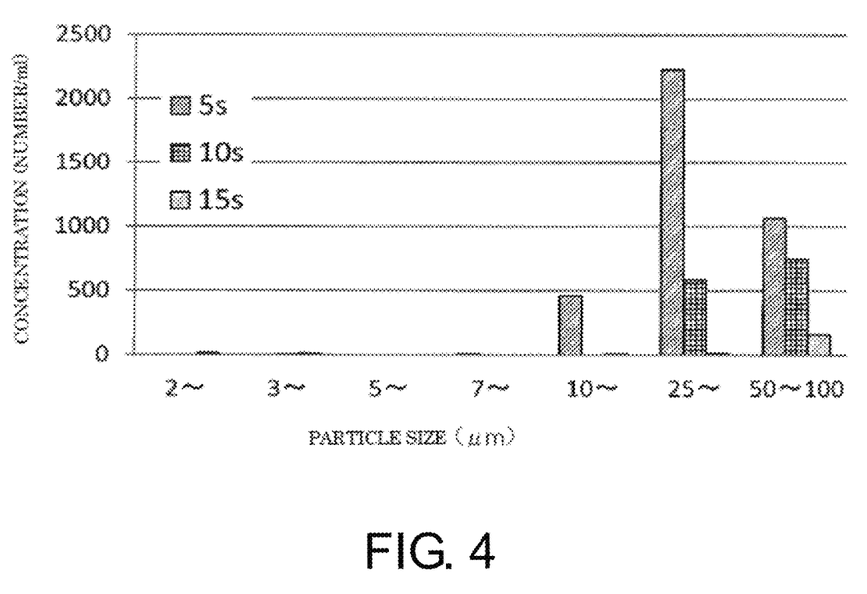
FIG. 4 is a graph showing results of measuring the bubble size distribution of fine bubbles (microbubbles) by a light obscuration method (particle counter) using the fine bubble analyzing system.

FIG. 4 is a graph showing results of measuring the bubble size distribution of the fine bubbles 10 (micro bubbles) by a light-shielding type (particle counter) using the fine bubble analyzing system. FIG. 4 shows measurement results of the bubble diameter distributions when the time from the introduction of the fine bubble-containing medium into the inlet 151 until the arrival at the measurement cell 21 is 5 seconds, 10 seconds, and 15 seconds. As described above, the fine bubble characteristic evaluation device 2 may be configured to measure the bubble size distribution of the fine bubbles 10 by the dynamic image analyzing method, the light obscuration method, or the like instead of the laser diffraction method.

As indicated in the measurement results shown in FIGS. 2 to 4, the bubble size distribution of the fine bubble 10 changes in accordance with the time from the introduction of the fine bubble-containing medium into the outlet 151 until the arrival at the measurement cell 21. The longer the arrival time, the smaller a total bubble amount. For the fine bubbles 10, which are unstable in the liquid 13, by using the fine bubble analyzing system including the retention vessel 12, the fine bubbles 10 are supplied to the fine bubble characteristic evaluation device 2 while conditions such as the retention time in the retention vessel 12 are maintained at a constant level. Thus, the bubble size distribution can be measured stably and accurately. The time to the arrival at the measurement cell 21 is preferably shorter since the concentration and the number of fine bubbles supplied to the fine bubble characteristic evaluation device 2 are large.

3. Layout of Inlet and Outlet

Figure 5:
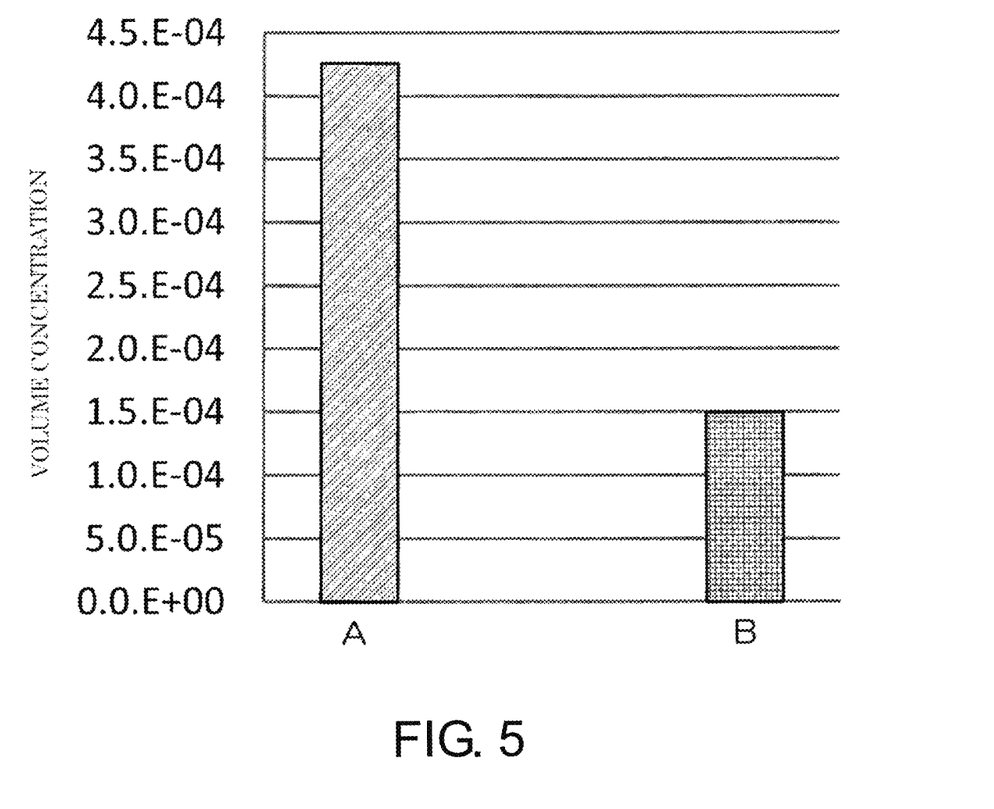
FIG. 5 is a graph showing measurement results when a positional relationship between an inlet and an outlet is changed.

FIG. 5 is a graph showing measurement results when a positional relationship between the inlet 141 and the outlet 151 is changed. As shown in FIG. 5, (A) when the outlet 151 is disposed near the inlet 141, the concentration of the fine bubbles 10 supplied to the fine bubble characteristic evaluation device 2 is high. On the other hand, (B) when the outlet 151 is disposed at a position diagonally above the inlet 141 at an angle of 45° apart from the inlet 141 by 15 cm, the concentration of the fine bubbles 10 supplied to the fine bubble characteristic evaluation device 2 decreases to about ½ to ⅓.

As described above, an appropriate setting of the positional relationship between the inlet 141 and the outlet 151 enables the fine bubbles 10 having a suitable concentration to be supplied to the fine bubble characteristic evaluation device 2 stably. In particular, when the outlet 151 disposed in the liquid 13 in the retention vessel 12 opens downward, the fine bubbles 10 retained in the liquid 13 are smoothly led out of the outlet 151 by buoyancy. Further, when the fine bubbles 10 are introduced into the liquid 13 in the retention vessel 12 from the inlet 141 disposed at a position lower than the outlet 151, the fine bubbles 10 that float by the buoyancy in the liquid 13 are stably led from the inlet 141 to the outlet 151. The fine bubbles 10 unstable in the liquid 13 can be thus supplied more stably. Note that the positional relationship between the inlet 141 and the outlet 151 is not limited to the above-described positional relationship. For example, the inlet 141 may open along a direction different from the horizontal direction.

4. Reynolds Number in Outlet Pipe

In the present embodiment, an inner diameter of the outlet pipe 15 and a flow velocity of the liquid inside the outlet pipe 15 are set such that a Reynolds number is 2,300 or less. Specifically, the outlet pipe 15 can be designed with the values shown in the following table.

TABLE 1

| | | Unit | | Example | | Comparative Example |
|---|---|---|---|---|---|---|
| Q | Introduction flow rate | ml/min | 25 | 166 | 211 | 362 |
| Re | Reynolds number | — | 149 | 986 | 1254 | 2151 |
| V | Introduction flow velocity | mm/s | 33 | 220 | 280 | 480 |
| d | Inner diameter | mm | 4 | 4 | 4 | 4 |
| ν | Kinematic viscosity | cSt[mm2/s] | 0.893 | 0.893 | 0.893 | 0.893 |

As shown in FIG. 1, the outlet 151 of the outlet pipe 15 is disposed in the liquid 13 in the retention vessel 12 and opens downward. That is, one end of the outlet pipe 15 in which the outlet 151 is formed extends in a vertical direction, and a lower end face is disposed so as to extend in a horizontal direction, and thus the outlet 151 opens downward.

On the other hand, the inlet 141 of the inlet pipe 14 is disposed at a position lower than the outlet 151. Specifically, the inlet pipe 14 extends in the horizontal direction, and one end of the inlet pipe 14 is disposed below the outlet 151 in the liquid 13 in the retention vessel 12. The inlet 141 formed at one end of the inlet pipe 14 opens toward the outlet 151 along the horizontal direction.

A straight line L connecting the inlet 141 and the outlet 151 is inclined with respect to the horizontal direction. An inclination angle of the straight line L with respect to the horizontal direction is preferably 30° to 60°, and is set to, for example, 45°. A length of the straight line L is preferably from 10 cm to 20 cm, and is set to, for example, 15 cm.

Here, when the liquid flow velocity is V (mm/s), the inner diameter of the outlet pipe 15 is d (mm), and a kinematic viscosity of the liquid is ν (mm$^2$/s), the Reynolds number Re is expressed by the equation (1).

$$Re = Vd/\nu \quad (1)$$

It is assumed that the inner diameter d of the outlet pipe 15 is 4 mm and the kinematic viscosity ν of the liquid flowing inside the outlet pipe 15 is 0.893 mm$^2$/s. As shown in the above table, when the liquid flow velocity V is 33 mm/s, the Reynolds number Re is 149. When the liquid flow velocity V is 220 mm/s, the Reynolds number Re is 986. When the liquid flow velocity V is 280 mm/s, the Reynolds number Re is 1,254. When the liquid flow velocity V is 480 mm/s, the Reynolds number Re is 2,151.

Each of these design values satisfies the conditions for setting the Reynolds number Re to 2,300 or less. The Reynolds number Re of 2,300 or less can prevent turbulence from occurring in the outlet pipe 15, and as a result, prevent a change in the bubble diameter and concentration of the fine bubbles 10. The fine bubbles 10 can be thus supplied more stably.

Figure 6:
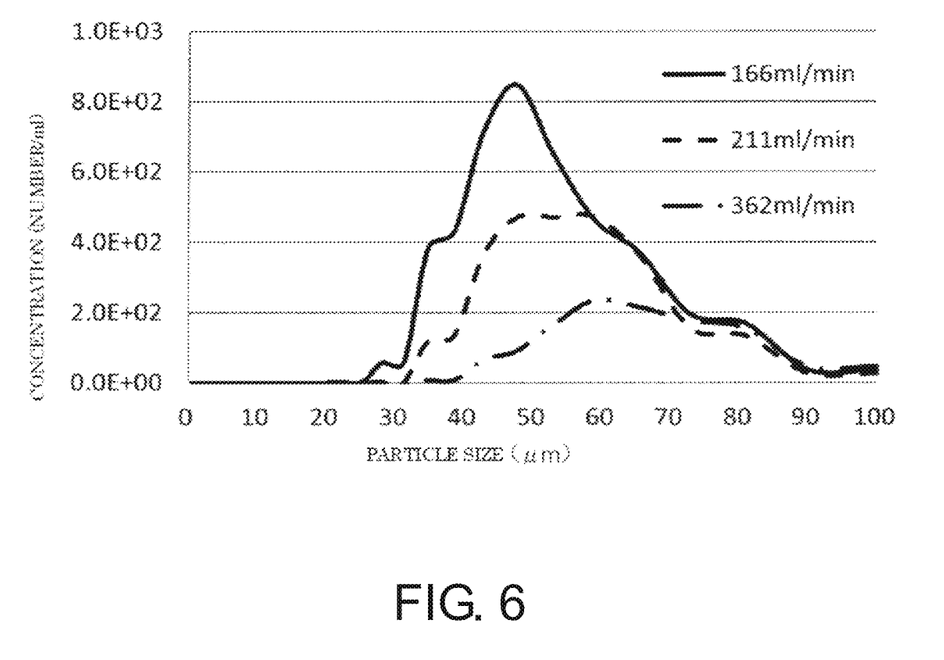
FIG. 6 is a graph showing measurement results when a flow rate of a liquid introduced into an outlet pipe by a pump is changed.

FIG. 6 is a graph showing measurement results when a flow rate Q of the liquid introduced into the outlet pipe 15 by the pump 3 is changed. As shown in FIG. 6, when the flow rate Q of the liquid is 211 ml/min (the liquid flow velocity V is 280 mm/s) or the flow rate Q of the liquid is 362 ml/min (the liquid flow velocity V is 480 mm/s) compared to when the flow rate Q of the liquid is 166 ml/min (the liquid flow velocity V is 220 mm/s), the bubble diameter of the fine bubble 10 is larger, and the bubble amount is smaller.

From such measurement results, the inner diameter of the outlet pipe 15 and the flow velocity of the liquid inside the outlet pipe 15 are preferably set such that the Reynolds number Re is 1,250 or less, more preferably 1,150 or less.

5. Inner Surface of Outlet Pipe

In the present embodiment, the outlet pipe 15 includes a material whose inner surface has a negative potential. Specifically, the inner surface of the outlet pipe 15 preferably includes a fluororesin or the like.

Figure 7:
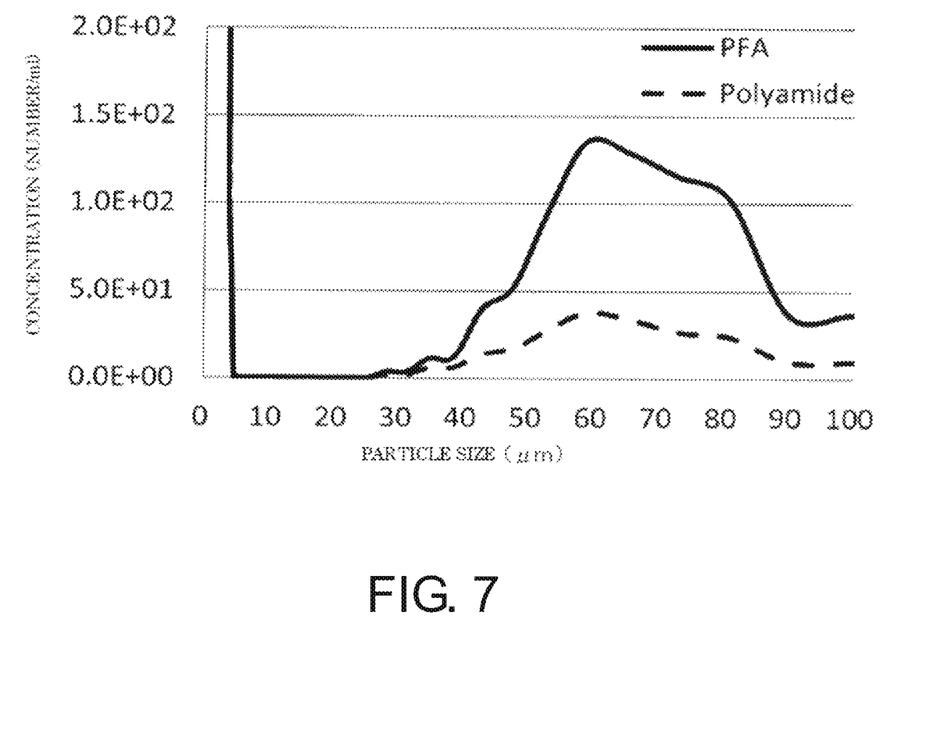
FIG. 7 is a graph showing measurement results when a material of inner surface of the outlet pipe is changed.

FIG. 7 is a graph showing measurement results when the material of the inner surface of the outlet pipe 15 is changed. As shown in FIG. 7, when the inner surface of the outlet pipe 15 includes nylon (polyamide) having a positive surface potential, the bubble amount of the fine bubbles 10 is decreased compared with a case where the inner surface of the outlet tube 15 includes a fluororesin (PFA) having a negative surface potential.

From such measurement results, the outlet pipe 15 preferably includes a material whose inner surface has a negative potential. The outlet pipe 15 whose inner surface has a negative potential can prevent the fine bubbles 10 having a negative surface potential from adhering to the inner surface of the outlet pipe 15. This allows the fine bubbles 10 to flow smoothly in the outlet pipe 15, thereby supplying the fine bubbles 10 more stably.

6. Other Conditions for Outlet Pipe

The inner diameter of the outlet pipe 15 is preferably larger, and can be set to, for example, 2 mm or more although not particularly limited thereto. This is because when the inner diameter is less than 2 mm, an interaction of the inner surface of the outlet pipe 15 may affect the characteristics of the fine bubbles. As described above, the length of the outlet pipe 15 is preferably shorter. The curvature of the outlet pipe 15 is preferably 100 mm or more although not particularly limited thereto. When the curvature is less than 100 mm, a vortex may be generated inside the outlet pipe 15, which may affect the characteristics of the fine bubbles. A surface roughness of the outlet pipe 15 is preferably 0.4 µm or less although not particularly limited thereto. When the surface roughness is greater than 0.4 µm, the interaction of the inner surface of the outlet pipe 15 may cause adsorption of the fine bubbles, which may eliminate the fine bubbles.

7. Modification

Figure 8:
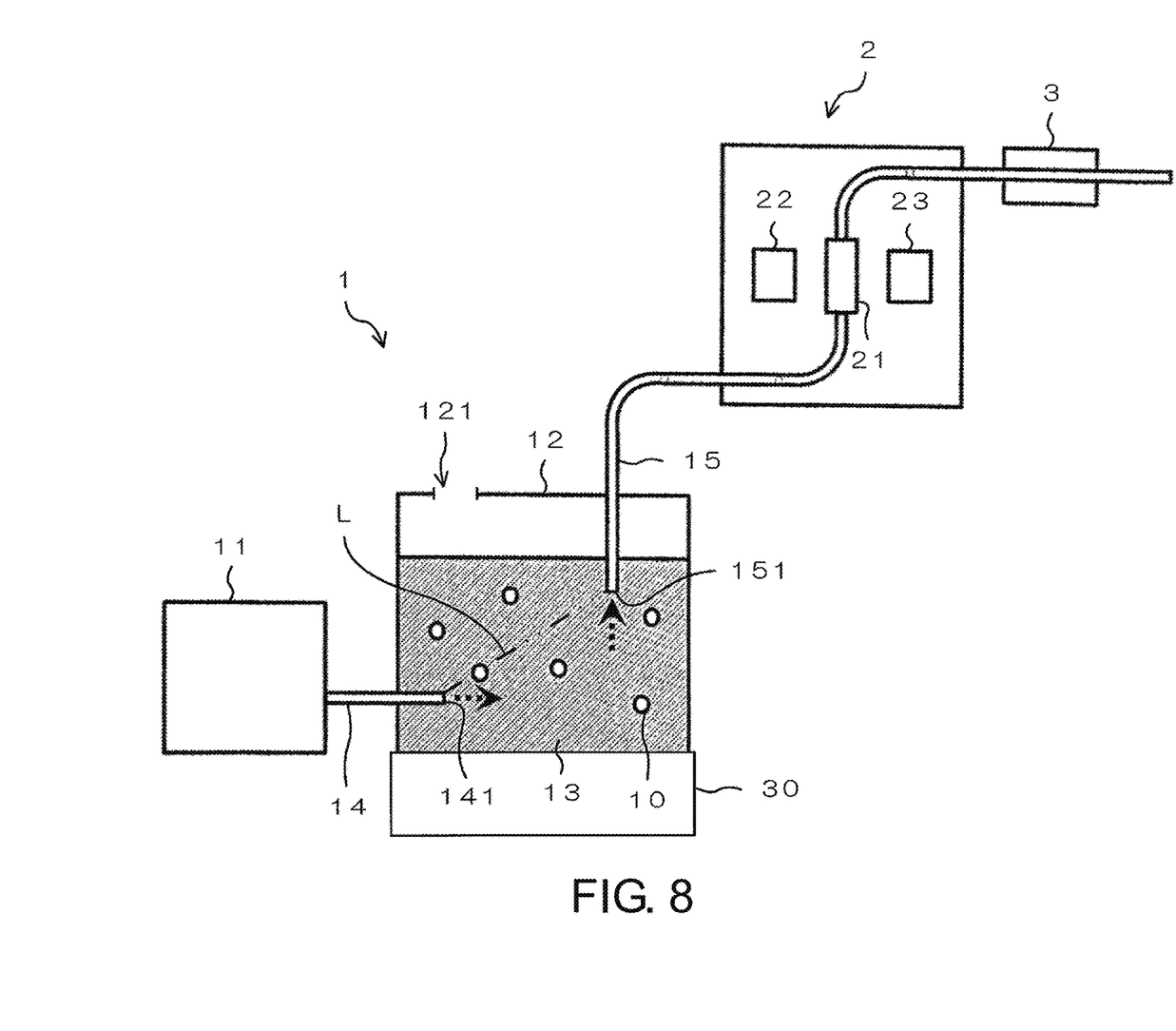
FIG. 8 is a schematic diagram showing a configuration example of a fine bubble analyzing system according to a modification of the present invention.

FIG. 8 is a schematic diagram showing a modification of the present invention. In this modification, a stirrer 30 is provided in the retention vessel 12. Similarly, in the retention vessel 12 of FIG. 1, the fine bubbles can be homogeneously dispersed in the retention vessel 12 by continuously introducing the fine bubbles into the liquid. However, the fine bubbles can be more homogeneously dispersed in the retention vessel 12 by providing the stirrer 30 to stir the liquid including the fine bubbles. The dispersion of the fine bubbles supplied to the fine bubble characteristic evaluation device 2 can be therefore more favorably homogenized. Thus, the fine bubbles can be more accurately evaluated in the fine bubble characteristic evaluation device 2. As the stirrer 30, for example, a magnetic stirrer can be adopted although not particularly limited thereto.

In the above embodiment, a case has been described where the fine bubble characteristic evaluation device 2 is a particle diameter distribution measurement device. However, the fine bubble analyzing system according to the present invention is also applicable to a configuration in which the fine bubbles 10 are supplied to a fine bubble characteristic evaluation device other than the particle diameter distribution measurement device.

Further, the supply destination of the fine bubbles 10 is not limited to the fine bubble characteristic evaluation device 2. That is, the fine bubble supply device according to the present invention can supply the fine bubbles not only to the fine bubble characteristic evaluation device 2 but to any supply destination.

DESCRIPTION OF REFERENCE SIGNS

1 fine bubble supply device
2 fine bubble characteristic evaluation device
3 pump
10 fine bubble
11 fine bubble generating device
12 retention vessel
13 liquid
14 inlet pipe
15 outlet pipe
21 measurement cell
22 light source
23 detector
121 opening
141 inlet
151 outlet

The invention claimed is:

1. A fine bubble analyzing method comprising:
    a step of generating fine bubbles using a fine bubble generating device;
    a step of introducing fine bubbles generated by the fine bubble generating device into a retention vessel in which a liquid including fine bubbles is stored and to which an inlet pipe and an outlet pipe of the fine bubbles are connected,
    a step of evaluating a characteristic of the fine bubbles supplied by the retention vessel to a supply destination;
    wherein the fine bubbles generated from the fine bubble generating device are introduced into the liquid including fine bubbles in the retention vessel through the inlet pipe and thus retained in the liquid, and the liquid retaining the fine bubbles is led out to the supply destination through the outlet pipe such that the liquid is in a state of laminar flow inside the outlet pipe,
    wherein the outlet pipe has an inner diameter and a liquid flow velocity inside the outlet pipe set such that a Reynolds number is 1,250 or less.

2. The fine bubble analyzing method according to claim 1, wherein the outlet pipe leads out the fine bubbles retained in the liquid from an outlet opening downward and disposed in the liquid in the retention vessel.

3. The fine bubble analyzing method according to claim 2, wherein the inlet pipe extends in a horizontal direction, and an inlet of the inlet pipe is disposed below the outlet in the retention vessel.

4. The fine bubble analyzing method according to claim 3, wherein a straight line connecting the inlet and the outlet is inclined by 30° to 60° with respect to the horizontal direction.

5. The fine bubble analyzing method according to claim 3, wherein the straight line connecting the inlet and the outlet is from 10 cm to 20 cm.

6. The fine bubble analyzing method according to claim 1, wherein the outlet pipe includes a material whose inner surface has a negative potential.

7. The fine bubble analyzing method according to claim 1, wherein an inner diameter of the outlet pipe is 2 mm or more.

8. The fine bubble analyzing method according to claim 1, wherein a curvature of the outlet pipe is 100 mm or more.

9. The fine bubble supply device analyzing method according to claim 1, wherein a surface roughness of the outlet pipe is 0.4 μm or less.

10. The fine bubble analyzing method according to claim 1, wherein the retention vessel functions as a buffer that homogenizes dispersion of the fine bubbles in the retention vessel by retaining the fine bubbles for retention time.

11. The fine bubble analyzing method according to claim 1, wherein the retention vessel is provided with a stirring device that further homogenizes the dispersion of the fine bubbles in the retention vessel by stirring the fine bubbles retained in the retention vessel.

* * * * *